United States Patent [19]

Marcus

[11] 4,421,355
[45] Dec. 20, 1983

[54] ILLUMINATED VISOR ASSEMBLY

[75] Inventor: Konrad H. Marcus, Holland, Mich.

[73] Assignee: Prince Corporation, Holland, Mich.

[21] Appl. No.: 286,339

[22] Filed: Jul. 23, 1981

[51] Int. Cl.³ .............................................. B60J 3/02
[52] U.S. Cl. ................................. 296/97 H; 362/144
[58] Field of Search ............... 296/97 H, 97 R, 97 B; 362/135, 136, 137, 140, 144, 155

[56] References Cited

U.S. PATENT DOCUMENTS 4,000,404  12/1976  Marcus ............................ 296/97 H

FOREIGN PATENT DOCUMENTS 860512   1/1941  France ............................... 362/137
2429685  1/1980  France ............................... 296/97 H
637001   5/1950  United Kingdom ................ 362/135

Primary Examiner—Joseph F. Peters, Jr.
Assistant Examiner—Ross Weaver
Attorney, Agent, or Firm—Price, Heneveld, Huizenga & Cooper

[57] ABSTRACT

A visor assembly for a vehicle includes a mirror mounted thereto and a pair of doors which swing open on pivot axes generally orthogonal to the longitudinal axis of the visor. In the preferred embodiment of the invention, light means are provided on each of the doors for directing illumination outwardly therefrom such that the visor mirror covered by the doors when closed and exposed when the doors are open, can be used in all ambient light conditions.

9 Claims, 8 Drawing Figures

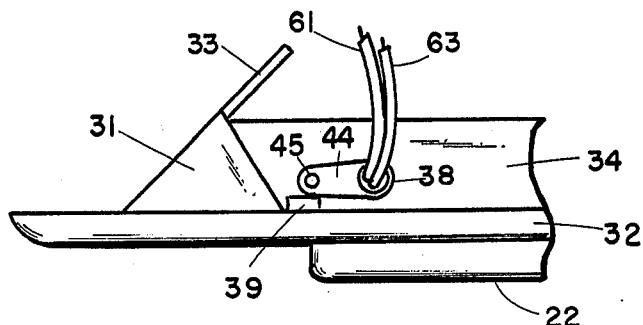
FIG 4
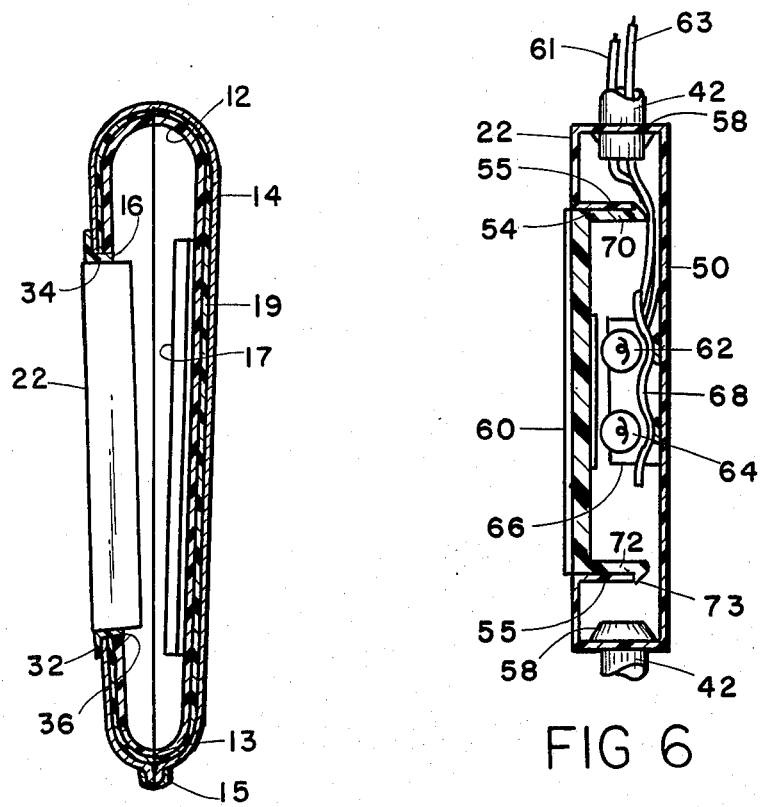
FIG 5
FIG 6
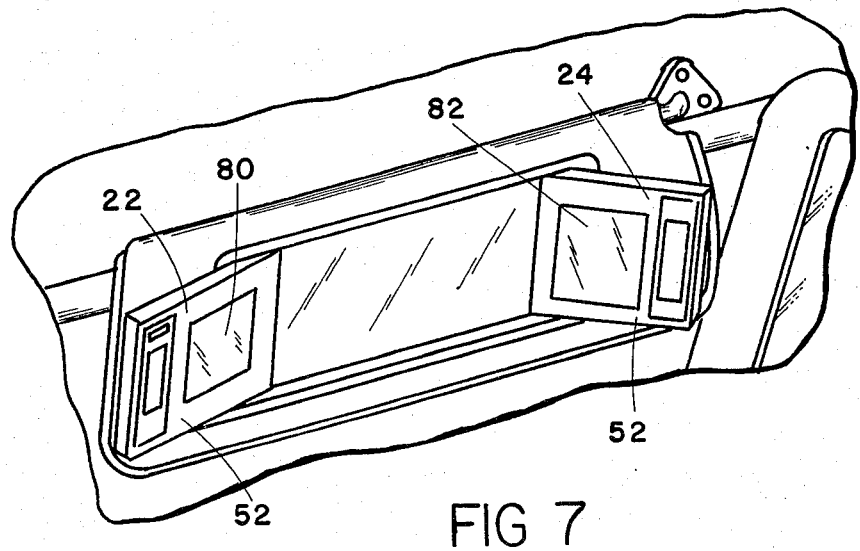
FIG 7

ILLUMINATED VISOR ASSEMBLY

BACKGROUND OF THE INVENTION

The present invention relates to vehicle visors and particularly to a visor assembly with an illuminated covered mirror.

Visor assemblies with illuminated mirrors having a light which is selectively operated by a protective and light shielding cover are represented by, for example, U.S. Pat. No. 4,227,241 issued Oct. 7, 1980 and assigned to the present assignee. Such visors conveniently provide the vehicle operator or passenger with a lighted mirror either for personal care use or when the visor is rotated to a map reading position directing light toward the lap of the user. Such visors have met with significant commercial success as original or optional equipment in relatively large top-of-the-line vehicles. As vehicle sizes have decreased in recent years, the visor assemblies have, of necessity, been reduced as well, thereby reducing the size of the mirror which is usable with an assembly such as disclosed in the above identified patent. If lights are placed immediately adjacent the opposite edges of such smaller mirrors the distance between the lights approach the inter-pupillary spacing between the eyes of an individual thereby tending to shine directly in the eyes which prevents use of the mirror.

SUMMARY OF THE PRESENT INVENTION

The present invention provides an illuminated visor assembly in which a relatively large mirror can be employed in a reduced sized visor by providing a source of illumination in one or more pivoted doors which move between a closed position covering the mirror assembly and an open position in which the source of illumination is moved outwardly from the edges of the mirror. When activated, the sourse directs light toward the face of a user, or when the visor is pivoted downwardly and forwardly, to the lap of the user for use as a map lamp. By providing the source of illumination in one or more cover doors, the visor body has sufficient room to accommodate a reasonably sized mirror even with smaller visors. The illumination means is mounted in the visor door and in the preferred embodiment a pair of doors opening from either side on an axis orthogonal to that of the visor movement on its pivot rod provide illumination on each side of the mirror without shining directly in the eyes of the user. In one embodiment of the invention supplemental mirrors are also placed on the inside of the doors to expand the reflective surface available. In another embodiment of the invention, over-center spring means are employed for holding the mirror covering doors selectively in an open or closed position.

These and other features, advantages and objects of the present invention will become apparent upon reading the following description thereof together with reference to the accompanying drawings in which:

BRIEF DESCRIPTION OF THE DRAWINGS

FIG. 4 is an enlarged fragmentary top plan view of a portion of the structure shown in FIGS. 1 and 3;

FIG. 5 is a cross-sectional view of a visor assembly embodying the present invention taken along section lines V—V of FIG. 1;

FIG. 6 is an enlarged vertical cross-sectional view of one of the door and light assemblies shown in FIGS. 1 and 3;

FIG. 7 is a perspective view of an alternative embodiment of the present invention.

DETAILED DESCRIPTION OF THE PREFERRED EMBODIMENT

Figure 1:
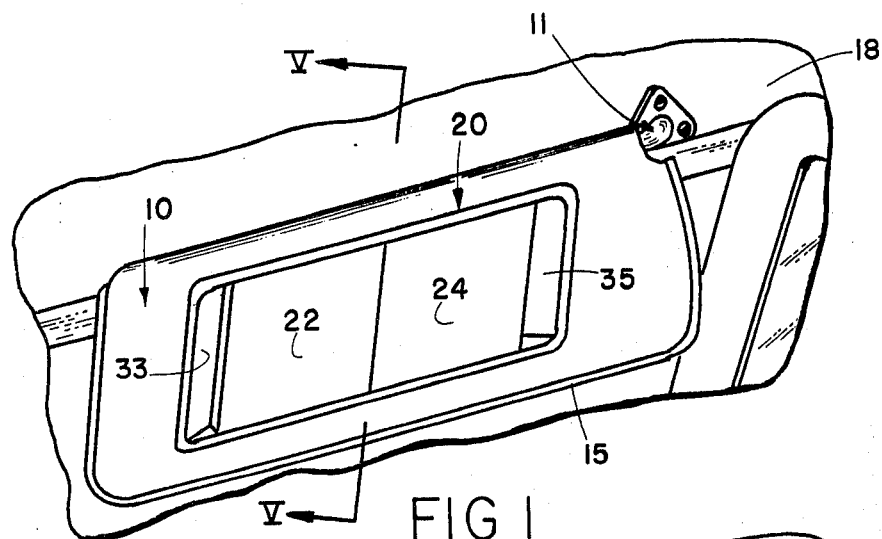
FIG. 1 is a perspective view of a visor embodying the present invention shown with the mirror covered.
Figure 2:
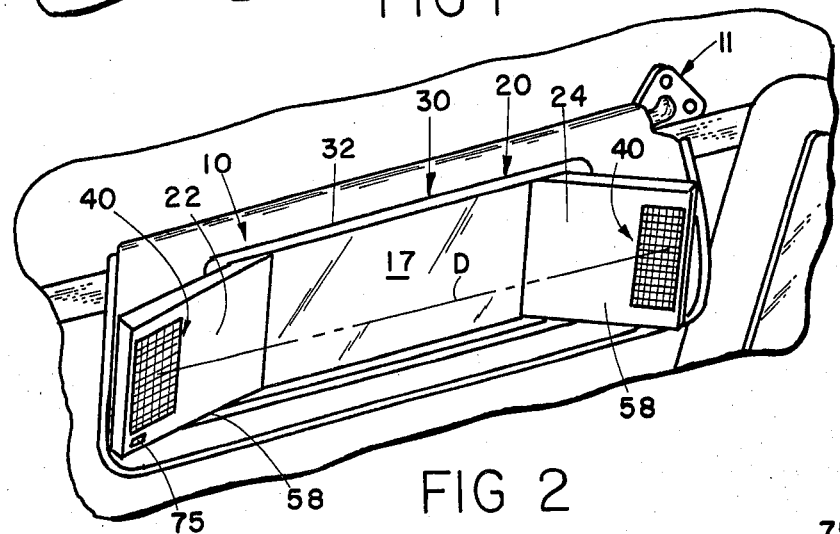
FIG. 2 is a perspective view of the structure shown in FIG. 1 shown with the doors open and the mirror uncovered.

Referring initially to FIGS. 1 and 2 there is shown a visor assembly 10 incorporating the present invention. Visor 10 includes an integral molded polymeric core or body 12 as shown in FIG. 5. The core is molded in joined halves subsequently folded and joined along an edge 13. The core is subsequently covered with a padded upholstery material 14 and an edge bead 15 extends around the outer peripheral seam. The core includes a central recess 16 for receiving therein a door and frame subassembly 20 which is conventionally secured within the recess 16 by means of suitable attachment screws, adhesives or other fastening means securing the rectangular frame assembly 20 within the generally rectangular recess 16 formed in visor body 12. A mirror 17 is secured within the inner rear wall of visor body 12 to be centrally located with respect to the visor and in general alignment with opening 16 which receives the door and frame assembly. An adhesive 19 is secured to the rear surface of the mirror 17 between the mirror and visor core 12 for securing the mirror to the visor core and for holding mirror fragments in place in the event the mirror is broken. The visor body 12 is mounted to a pivot rod and elbow assembly 11 to pivot between a raised position stored against the headliner 18 of a vehicle or to a downwardly rotated operative position for blocking the sun as shown in FIG. 1 and which also positions the visor for use of the mirror and illumination means as shown in FIG. 2.

The visor core construction is substantially the same as that disclosed in the above identified U.S. Pat. No. 4,227,241, the disclosure of which is incorporated herein by reference as is its mounting to the pivot rod and elbow assembly 11 for securing the visor to the vehicle headliner 18 permitting pivotal rotation of the visor about the pivot rod as well as movement of the visor from the windshield area as shown in FIGS. 1 and 2 to the side of the vehicle.

Mirror 17 mounted within recess 16 is covered by the door assembly 20 as shown in FIG. 1 and includes in the preferred embodiment shown, a pair of doors 22 and 24 which can be swung open as shown in FIG. 2 to uncover the mirror for use. The doors are pivotally mounted within a frame 30 to pivot on a transverse axis generally orthogonal to the longitudinal axis of movement of visor 10 about pivot rod 11. The visor doors themselves move in a direction parallel to longitudinal dimension of the rectangular visor. In the preferred embodiment of the invention each of the doors include a source of illumination comprising a light and lens assembly 40 which directs light outwardly from the door assembly 20 and outwardly from the edges of the mirror. The distance D (FIG. 2) thus is significantly greater than the inter-pupillary spacing between an individuals eyes even with relatively small mirrors. Such construction illuminates the face of a user when the visor is in a generally downwardly vertical position permitting use of the mirror 17 in all ambient light conditions without shining directly in the users eyes. When the visor is further pivoted toward the windshield of the vehicle it directs light in a generally downwardly direction toward the lap of a user thereby permitting use of the source of illumination for reading a map or the like. Having briefly described the overall visor construction a detailed description of the door and frame assembly 20 is now presented in conjunction with FIGS. 3 through 8.

Figure 3:
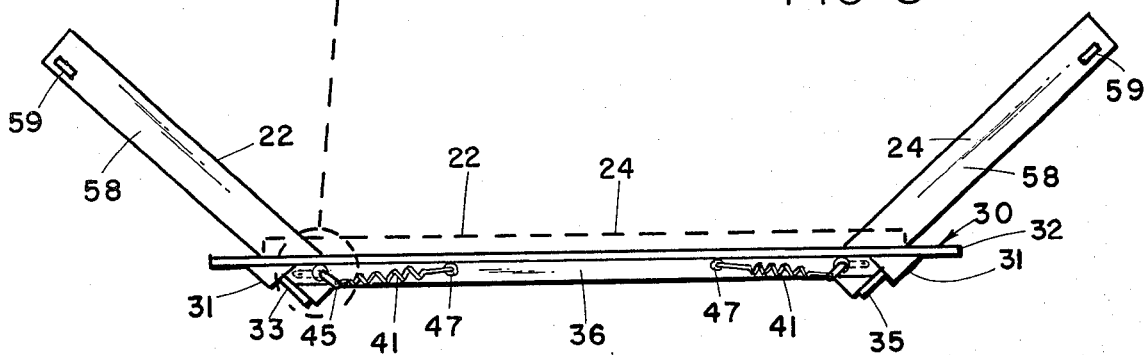
FIG. 3 is an enlarged bottom plan view partly expanded of the door and frame subassembly shown in FIGS. 1 and 2.

Frame 30 comprises a molded generally rectangular member integrally including an outer peripheral flange 32 extending therearound and upper and lower inwardly extending walls 34 and 36 respectively (FIGS. 3 and 4). Walls 34 and 36 extend inwardly and fit snugly within the recess 16 formed in core 12 of the visor. Sidewalls 33 and 35 are inclined inwardly from the opposite ends of frame 30 and are joined to walls 34 and 36 by means of triangular integral joining members 31 (FIGS. 3 and 4). By inclining the end walls 33 and 35, clearance is provided for the pivotally mounted doors 22 and 24 as seen in FIG. 3 providing also a surface serving as a stop at the door open position which is approximately 135° from the closed position. Upper and lower walls 34 and 36 each include an aperture 38 at opposite ends and near flange 32 as best seen in FIG. 4 for rotatably receiving a pivot collar 42 (FIG. 6) extending from opposite ends of each of the doors 22 and 24. Thus, for example, the collars 42 associated with door 22 extend through and are free to rotate within vertically aligned apertures 38 formed in walls 34 and 36 on one end of the frame, while similar apertures and collars pivotally couple door 24 to the right end of frame 30. As seen in FIG. 6, the collars 42 are fixedly secured to the walls 58 of each of the doors by a suitable bonding adhesive. Integrally formed with collars 42 is an outwardly extending dog 44 (FIGS. 3 and 4) having an aperture 45 near the end thereof for use as shown in FIG. 3 in connection with an over-center spring for selectively holding the doors in an open and/or closed position as discussed below. The dog 44 on the upper collars 42 as seen in FIG. 4 cooperate with a door stop 39 comprising a projection integral with the frame for interengaging the edge of dog 44 to limit the inward extension of the doors such that doors 22 and 24 extend generally in parallel relationship with the peripheral flange 32 and project slightly outwardly therefrom as shown in FIG. 4.

Associated with each of the pivoted doors 22 and 24 is a spring means for holding the doors in an open and/or closed position. In the preferred embodiment, as seen in FIG. 3 the spring means are mounted at the bottom edge of frame assembly 30 and include a first spring 41 anchored to aperture 45 on dog 44 at one end, and to a post 47 at its opposite end. Spring 41 in the position as shown in solid lines in FIG. 3 tends to pull on dog 44 thereby rotating collar 42 in a counterclockwise direction for holding door 22 in its open position. As shown in phantom form, when door 22 is manually closed, dog 44 rotates in a clockwise direction as shown in FIG. 3 such that aperture 45 is on the other side of the center of rotation of pivot collar 42 such that spring 41 tends to rotate collar 42 clockwise and hold door 22 closed. A symmetrical spring biasing arrangment is provided with respect to door 24 as shown in FIG. 3. Although in the preferred embodiment it was discovered that springs were only required at the lower end of the assembly, if desired, springs can be similarly positioned in association with the upper wall 34 and pivot collars associated with the doors. In order to assist in the opening of the spring loaded doors, indentations 59 (FIG. 3) forming fingertip grips on the outer bottom edge 58 of the doors near the center of the doors are provided.

Figure 8:
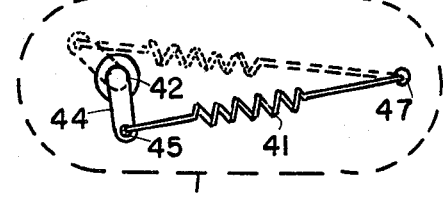
FIG. 8 is an electrical circuit diagram in schematic form of the electrical circuit employed in the visor of the present invention.
Figure 8:
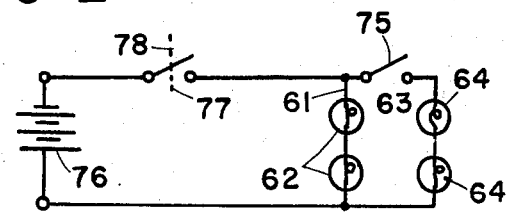

As best seen in FIG. 6 each of the doors 22 and 24 comprise generally rectangular members having a hollow interior for receiving the light assemblies. Each of the doors therefore comprise a generally solid rear wall 50, a front wall 52 having a rectangular opening 54 defined by inwardly projecting peripheral flanges 55 for receiving a lens 60 therein. The doors also include sidewalls 56 and upper and lower walls 58, all integrally joined. Thus, each of the doors has an inner space in which there is mounted a pair of lamps 62 and 64 (FIG. 6) secured to a dual lamp socket 66 which, in turn, is conventionally mounted to the inner surface of rear wall 50. A pair of electrical wires 61 and 63 extend outwardly through the hollow pivot collar 42 as shown and are coupled in the circuit as shown in FIG. 8 for providing operating power to the lamps 62 and 64. A reflector 68 secured to rear wall 50 and positioned behind lamps 62 and 64 is concavely curved to direct illumination from the lamps outwardly through the lens 60 which has flanges 70 and 72 along its top and bottom edges with outwardly extending tabs 73 which fit over and snap lock the lens 60 to peripheral flanges 55 of the door. Each door is similarly constructed to provide a pair of lamps, one of which is operated for low intensity light and the second of which can be operated for doubling the intensity of light by means of a switch 75 (FIGS. 2 and 8) mounted to one of the doors at a convenient location.

Referring now to FIG. 8 there is shown one embodiment of an electrical circuit which will provide dual intensity illumination for each of the doors. The vehicle's power source, such as its battery 76 is coupled to the visor lighting system by means of a switch 77 which can be conveniently mounted between one of the doors and the frame 30 can be mechanically actuated to close upon the opening of the door. This mechanical actuation by door movement is represented schematically by interconnection 78 shown in FIG. 8. The closing of switch 77 applies power to conductor 61 for actuating first lamps 62 providing, for example, low intensity illumination. If higher intensity illumination is desired, switch 75 is closed providing operating power to conductor 63 which activates lamps 64 to supply increased intensity illumination. The ground return conductor 76 for lamps 62 and 64 can be completed through the vehicle's system ground and typically is achieved by coupling the ground connection wire to the pivot rod assembly 11 which is secured to the body of the vehicle.

In an alternative embodiment of the invention as shown in FIG. 7, the basic visor construction is identical to that of the embodiment shown in FIGS. 1 and 6 and with the exception that auxiliary mirror panels 80 and 82 are added to the doors 22 and 24 for increasing the reflective surface available. The mirrors 80 and 82 are secured therefore to the front surface 52 of the doors by means of a suitable backing adhesive such as an adhesive pad which serves not only to bond the mirror to the door but also to prevent mirror fragments from leaving the door in the event a mirror is broken. If desired, the area occupied by each of the mirrors 80 and 82 in wall 52 can be recessed such that the mirrors are generally flush with the bordering surface of the door.

It will become apparent to those skilled in the art that various modifications to the preferred embodiment of the invention described and disclosed herein can be made without departing from the spirit or scope thereof as defined by the appended claims.

The embodiments of the invention in which an exclusive property or privilege is claimed are defined as follows:

1. A visor assembly for a vehicle comprising:
a generally rectangular visor body having a length in a longitudinal direction greater than its width in a transverse direction;
means for mounting said visor body to a vehicle for movement between a stored position and an operative sun screening position;
a mirror mounted to said visor body for use by a vehicle occupant; and
door means pivotally mounted with respect to said visor body for movement about an axis generally orthogonal to said longitudinal direction and between a closed position covering said mirror and an open position uncovering said mirror, and wherein said door means includes light means for directing illumination away from said visor when said door means is in said open position.

2. The visor assembly as defined in claim 1 wherein said door means comprises a pair of doors mounted on opposite sides of said mirror with said light means positioned therein to be spaced apart from one another a distance significantly greater than the inter-pupillary distance of the human eyes.

3. The visor assembly as defined in claim 2 and further including frame means surrounding said mirror and secured to said visor body and wherein said doors are pivotally mounted to said frame means.

4. The visor assembly as defined in claim 3 wherein each of said doors includes a light assembly including a lamp and lens means positioned to direct light from said lamp.

5. The visor assembly as defined in claim 4 and further including means for selectively holding said doors in a closed position and an open position.

6. The visor assembly as defined in claim 5 wherein each of said doors further include auxiliary mirror means.

7. A visor assembly for a vehicle comprising:
a generally rectangular visor body having a length in a longitudinal direction greater than its width in a transverse direction;
means for mounting said visor body to a vehicle for movement between a stored position and an operative sun screening position;
a mirror mounted to said visor body; and
means for pivotally mounting a pair of doors to said visor body on opposite edges of said mirror for covering said mirror when closed, each of said doors including means for directing illumination outwardly when the doors are opened and thereby expose said mirror.

8. The visor assembly as defined in claim 7 and further including means for selectively holding said doors in open and closed positions.

9. The visor assembly as defined in claim 8 and further including auxiliary mirrors mounted to each of said doors to increase the reflective area when said doors are opened.

* * * * *